H. A. RASMUSSEN.
LIGHT DEFLECTOR.
APPLICATION FILED JUNE 29, 1920.

1,409,574.

Patented Mar. 14, 1922.
2 SHEETS—SHEET 1.

H. A. Rasmussen.
Inventor

By Lancaster and Allwine
Attorneys

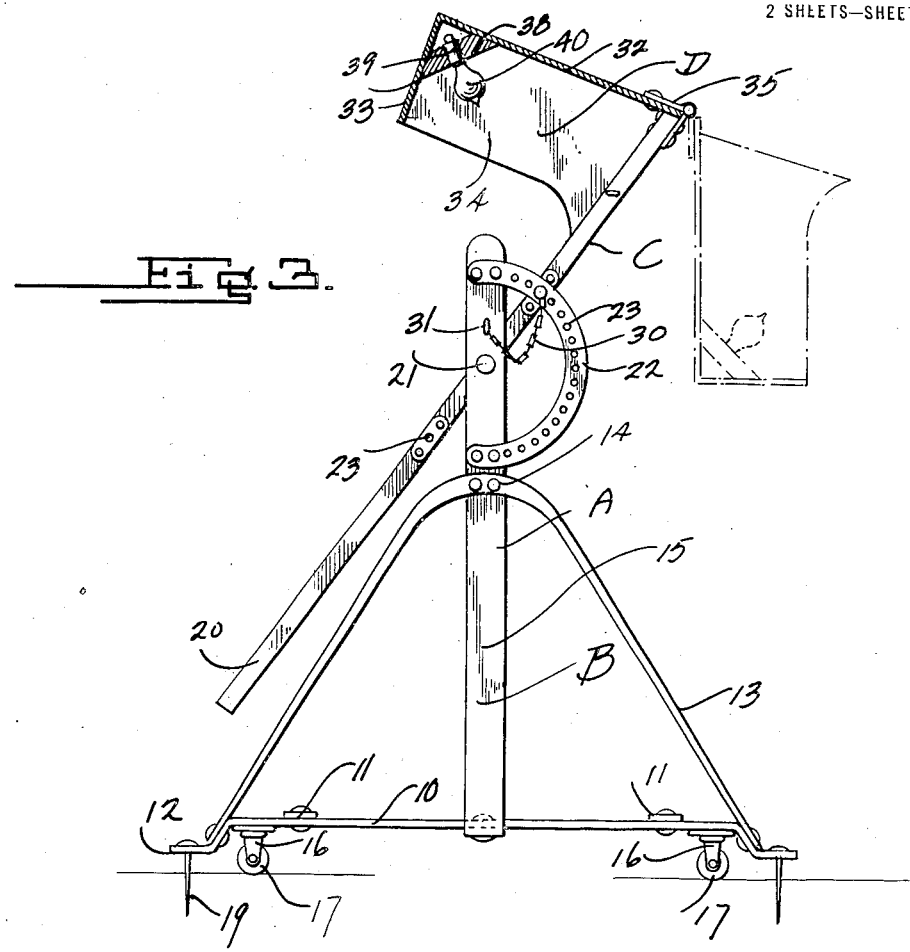
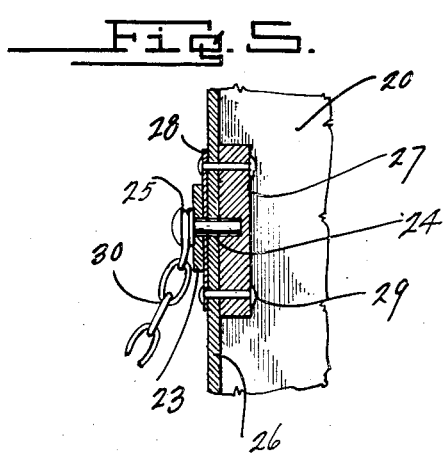
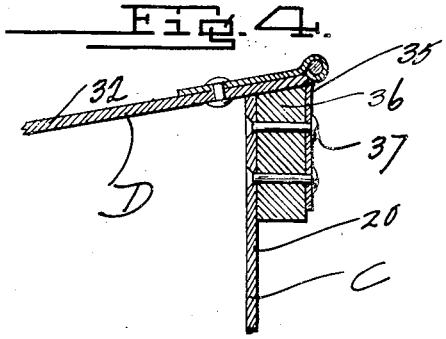

UNITED STATES PATENT OFFICE.

HARRY A. RASMUSSEN, OF LOS ANGELES, CALIFORNIA.

LIGHT DEFLECTOR.

1,409,574.   Specification of Letters Patent.   Patented Mar. 14, 1922.

Application filed June 29, 1920. Serial No. 392,680.

*To all whom it may concern:*

Be it known that I, HARRY A. RASMUSSEN, a citizen of the United States, residing at Los Angeles, in the county of Los Angeles and State of California, have invented certain new and useful Improvements in Light Deflectors, of which the following is a specification.

This invention relates to light deflectors and the primary object of the invention is to provide an improved light deflector which is particularly adapted for moving picture work either in the field or studio, and which is susceptible for many other uses.

Another object of the invention is to provide an improved deflector which is adapted for deflecting either sun light or artificial light and which can be adjusted to any angle that is best suited for the work being done.

In moving picture photography, it has heretobefore been customary to provide large arc lights for illumination, but owing to the fact that these lights sputter and flicker, causing the ruining of the films, other means have been sought after by motion picture directors. Further these arc lights require a great deal of attention and emit a dust, which is disagreeable to the eyes. It is therefore another object of the invention to provide an improved means for effectively providing an efficient illuminating device for motion picture work which will give a steady uninterrupted light of great brilliancy and which will require little or no attention.

A further object of the invention is to provide an improved light deflector embodying an adjustable light deflecting plane having associated therewith a casing carrying a plurality of high powered tungsten incandescent bulbs, the casing being adapted to be swung to an inoperative position in relation to the light deflecting plane when the same is being used for deflecting sun light.

A still further object of the invention is the provision of a wheeled frame, which can be readily moved to any desired location and having means for holding the same against accidental movement when the frame is positioned in the desired location, the frame carrying a hinged light deflecting plane, means being provided for directing artificial light rays upon said plane whereby the light rays will be deflected and diffused to the desired location.

With these and other objects in view, the invention consists in the novel construction, arrangement and formation of parts as will be hereinafter more fully described, claimed and illustrated in the accompanying drawings, forming a part of this specification, in which drawings:

Figure 3 is an end elevation of the improved light deflector showing the casing carrying the incandescent light bulb in cross section.

Figure 4 is a detail sectional view illustrating the means for hingedly connecting the light bulb carrying casing with the light reflecting plane, and Figure 5 is a detail sectional view through the improved apparatus showing the means employed for holding the light deflecting plane in any adjusted position.

Figure 1:
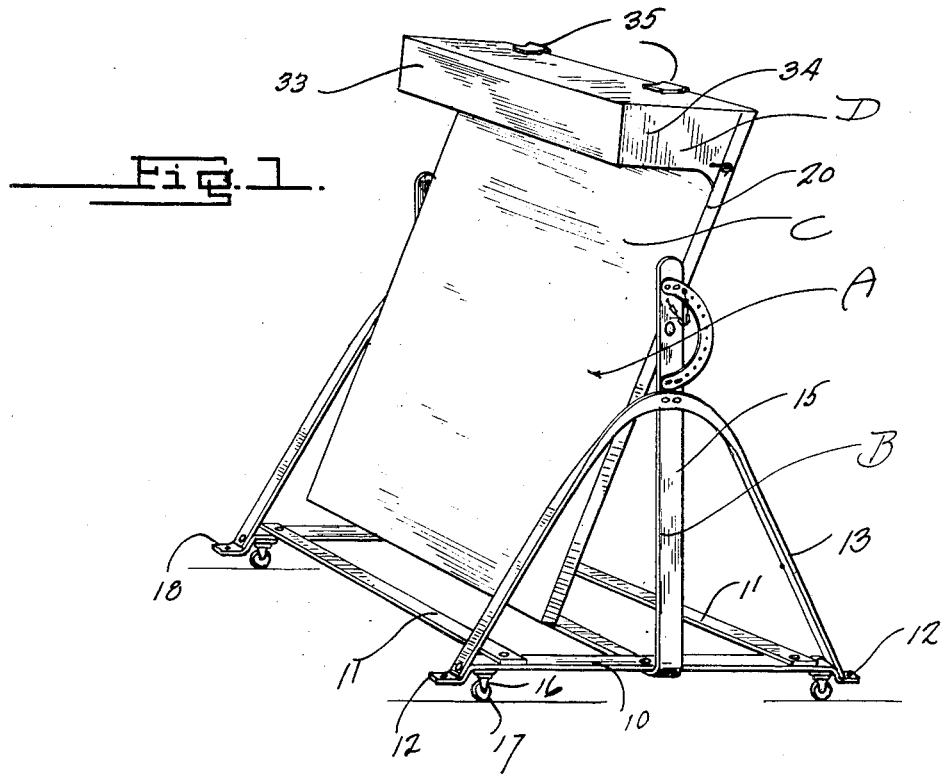
Figure 1 is a perspective view of the improved light deflecting apparatus.
Figure 2:
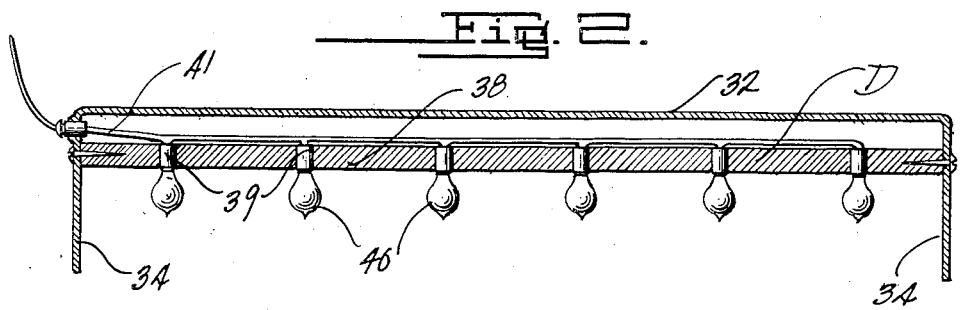
Figure 2 is a longitudinal sectional view through the casing carrying the incandescent light bulb.

Referring to the drawings in detail, wherein similar reference characters designate corresponding parts throughout the several views, the letter A generally indicates the improved light deflecting apparatus which includes the frame B, the light deflecting plane C, and the artificial light carrying casing D.

The frame B is preferably formed of metal and the like and includes the end straps 10 and the connecting side straps 11. The terminals of the end straps 10 are provided with downwardly and outwardly extending feet 12, the purpose of which will be hereinafter more fully described. The terminals of the end bars 10 also support the inverted vertically disposed substantially U-shaped supporting members 13 which have their central portions riveted or otherwise secured as at 14 to the upstanding standards 15. These standards 15 may be formed integral with the center strip of the side longitudinal strips 11 or can be secured thereto in any preferred manner. The lower surface of the end bars 10 swivelly carries forks 16 which rotatably support caster wheels 17. These caster wheels 17 form means for permitting the easy pushing of the frame to any desired place. The outwardly extending feet 12 are provided with openings 18 which are adapted to receive retaining members 19. These retaining members are adapted to engage the ground or floor so as to hold the frame against accidental displacement after the same has been moved to a desired location.

The upper ends of the standards 15 carry the light deflecting member or plane C and this light deflecting plane or member C includes a substantially rectangular flat plate 20 formed of any desired material. The outer surface of this plate is preferably coated with a good grade of aluminum whereby a good reflecting surface will be obtained. The side edges of the plate 20 intermediate its ends is provided with the outwardly extending pivot pins 21 which are rotatably mounted in suitable bearings or openings carried by the standards 15. The upper end of the standards 15 carry the arcuate semi-circular locking bars 22 and the pivot pins 21 are arranged at the point from which the arc of the circle is struck. These locking bars are provided with a plurality of spaced openings 23 and the side edges of the plate 20 are provided with openings 24 which are adapted to register with any one of the openings 23. A removable pin 25 is provided and this pin is adapted to be placed in the registering opening so as to hold the reflecting plane in any preferred adjusted position.

As shown in Figure 5 of the drawings, the side edges of the plate 20 are provided with right angularly extending flanges 26 and these flanges 26 are reinforced by blocks 27 on the inner surface thereof, and by plates 28 on the outer surface thereof. Suitable rivets or the like 29 are used so as to hold the reinforcing plates and blocks against displacement. The reinforcing plates are provided with suitable openings aligning with the openings formed in the segments or locking bars 22 and in the flanges 26. The block 27 is provided with a socket for the reception of the pin. To prevent loss of the pin 25 a chain 30 is provided and one end of the chain is attached to the pin while the other end is attached to a suitable eye 31 carried by the standard 15.

The upper end of the deflecting plane C carries a light casing D and this light casing D includes the upper wall 32, the front depending wall 33 and the side walls 34. Suitable strap hinges 35 are provided for hingedly connecting the casing D with the deflecting plane C and the upper edge of the plate 20 has its rear surface carrying a block 36 to which is secured by rivets or the like 37 the hinges 35.

The front wall 33 and the upper wall 32 supports the diagonally positioned base plate 38, and this base plate 38 is provided with a plurality of lamp sockets 39 for the reception of the lamp bulbs 40 which are preferably of the high powered daylight blue tungsten incandescent type. While daylight blue tungsten incandescent lamps have been stated as these lamps give a light similar to day light, it is to be understood that any other preferred type of lamp may be carried by the base plate and these lamps may be colored to suit any desired color scheme. The bases 39 have connected thereto suitable electric wires 41, the terminals of which may carry suitable plugs whereby the lamp may be connected at any preferred outlet socket. If so desired, each one of the sockets 39 may be provided with control switches whereby any number of the lamps may be used so as to obtain the desired brilliancy. Hooks and eyes have been provided for holding the hood or light casing D in position in relation to the deflecting plane, as clearly shown in the drawings.

In operation of the improved deflecting screen the hood D is swung into operative position as clearly shown in Figures 1 and 3 so that the rays of light from the lamp bulbs 40 will be thrown on the plane C where the rays will be deflected and diffused to the desired place. When the plane is to be used for deflecting sunlight the hood or casing D is swung back to an inoperative position as clearly shown in the dotted line position in Figure 3 of the drawings. This arrangement completely uncovers the entire face of the deflecting plane and thus permits the entire area thereof to be used as a light deflecting surface.

While I have stated that the deflecting screen is particularly adapted for moving picture work, it is to be understood that the uses to which the light deflecting screen may be put are unlimited and the deflecting plane may be used to a great advantage in ordinary gallery photography and for special illumination such as lighting spectacular settings for display advertising and the like. It also could be used for signalling on aviation fields and the like.

The deflecting screen does not require special care and no money is necessary for the upkeep thereof.

From the foregoing description it can be seen that an improved light deflecting screen has been provided of exceptionally simple and durable construction which can be used with a maximum amount of efficiency in photography work.

It is to be also understood that the inner surface of the light casing or hood D may be coated with aluminum so as to provide a reflecting surface.

Changes in details may be made without departing from the spirit or scope of this invention; but,

I claim:

1. In a deflecting light apparatus, a supporting frame, a light deflecting plane carried by the supporting frame and arranged to be swung about a horizontal axis in relation thereto, and a light carrying hood carried by the plane and arranged to be swung in front of the plane to an operative position or in rear of the plane to an inoperative position.

2. A light deflecting apparatus comprising a wheeled frame, a flat plate carried by the frame and arranged to be swung about a horizontal axis in relation thereto, means for holding the plate in any desired position in relation to the frame, the plate having a reflecting surface, and an artificial light carrying hood hingedly secured to the upper portion of the plate adapted to be swung in front of and in rear of said plate.

3. A light deflecting apparatus comprising a wheeled supporting frame, means for holding the frame against movement, a deflecting plane carried by the frame and arranged to be moved about a horizontal axis in relation to the frame, means for holding the plane against movement, a casing hingedly secured to the upper end of said plane, and a battery of incandescent lamps arranged in said hood.

4. A light deflecting apparatus comprising a supporting frame including a base, and upwardly extending standards, outwardly extending feet formed on the base, rollers carried by the base, and removable pins carried by the feet arranged to engage the supporting surface on which the frame is positioned, a light deflecting plane arranged between the supporting standards, bearings formed on the supporting standards, outwardly extending pivot pins carried by the opposite sides of the deflecting plane intermediate its ends and fitted in said bearings, means for holding the plane against accidental movement, a hood hingedly connected to the upper edge of the plane and adapted to be thrown in front of the plane or in rear thereof, and a battery of high powered incandescent lamps arranged in said hood.

HARRY A. RASMUSSEN.